US012331928B1

(12) United States Patent
Ressler et al.

(10) Patent No.: US 12,331,928 B1
(45) **Date of Patent: *Jun. 17, 2025**

(54) FIRE PIT ASH CLEANUP

(71) Applicant: Lamplight Farms Incorporated, Menomonee Falls, WI (US)

(72) Inventors: Kyle Ressler, West Bend, WI (US); Daniel J. Knight, Murfreesboro, TN (US); Andrew Alan Harmeling, Milwaukee, WI (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 397 days.

This patent is subject to a terminal disclaimer.

(21) Appl. No.: 17/348,382

(22) Filed: Jun. 15, 2021

(51) Int. Cl.
*F23J 1/02* (2006.01)
*F27D 99/00* (2010.01)

(52) U.S. Cl.
CPC ......... *F23J 1/02* (2013.01); *F27D 2099/0093* (2013.01)

(58) Field of Classification Search
None
See application file for complete search history.

(56) References Cited

U.S. PATENT DOCUMENTS

| | | | | |
|---|---|---|---|---|
| 270,503 A * | 1/1883 | Stopple | F26B 9/06 | 34/233 |
| 1,445,471 A * | 2/1923 | Ballou | F24B 13/008 | 126/243 |
| 3,500,812 A * | 3/1970 | Otto | A47J 37/0704 | 126/25 R |
| 5,086,752 A * | 2/1992 | Hait | A47J 37/0704 | 126/25 R |
| 5,655,435 A * | 8/1997 | Rachesky | A47J 37/0704 | 99/449 |
| 5,836,298 A * | 11/1998 | Grady | F24B 1/181 | 126/506 |
| 5,996,572 A * | 12/1999 | Llagan | A47J 37/0786 | 126/30 |
| 6,363,925 B1 * | 4/2002 | Chavana, Jr. | A47J 37/0731 | 126/25 R |
| 9,554,669 B1 * | 1/2017 | Hughes | A47J 37/0731 | |
| 11,391,465 B1 * | 7/2022 | Weilert | F24B 5/026 | |
| 2005/0247299 A1 * | 11/2005 | Rodriguez | A47J 37/0704 | 126/50 |
| 2008/0000360 A1 * | 1/2008 | Pai | A47J 37/0713 | 99/445 |
| 2009/0025574 A1 * | 1/2009 | Byrnes | A47J 37/0704 | 426/523 |
| 2011/0271949 A1 * | 11/2011 | Ortner | A47J 37/0704 | 126/25 R |
| 2012/0196232 A1 | 8/2012 | Miller | | |
| 2020/0281404 A1 * | 9/2020 | Benson | A47J 37/0759 | |
| 2021/0038022 A1 * | 2/2021 | Gippert | A23B 4/052 | |
| 2021/0282592 A1 * | 9/2021 | Jan | A47J 37/0763 | |
| 2022/0178545 A1 * | 6/2022 | Hale | F24B 1/195 | |

* cited by examiner

*Primary Examiner* — David J Laux
(74) *Attorney, Agent, or Firm* — GableGotwals; David G. Woodral

(57) ABSTRACT

A fire pit has a combustion chamber with a perforated floor, a chute below the perforated floor directing ash and debris from the floor to an area below the chute, and a removable ash pan occupying the area below the chute and having a handle affixed thereto.

11 Claims, 7 Drawing Sheets

FIRE PIT ASH CLEANUP

FIELD OF THE INVENTION

This disclosure relates to outdoor combustion devices in general and, more specifically, to outdoor solid fuel fire pits.

BACKGROUND OF THE INVENTION

Outdoor firepits may be equipped to burn solid fuel in the form of natural logs, synthetic logs, fuel packs, or other fuel types. Some fire pits are designed to deliver brighter flame and lower amounts of smoke by reliance on internal combustion chambers that control and direct the influx of combustion air relative to the burning fuel inside. However, all solid fuel types will still result in some amount of ash and possibly other solid by-products that do not burn.

Fire grates that are known in the art can allow ash and other solid products that are smaller than a certain size to fall away from the fuel source such that they will not immediately impede the fire or be likely to be drawn out of the fire pit with hot gaseous combustion products. However, the ash must be dealt with and removed at some point or performance of the fire pit will ultimately diminish.

What is needed is a system and method for dealing with the above and related issues.

SUMMARY OF THE INVENTION

The invention of the present disclosure, in one aspect thereof, comprises a fire pit having a combustion chamber with a perforated floor, a chute below the perforated floor directing ash and debris from the floor to an area below the chute, and a removable ash pan occupying the area below the chute and having a handle affixed thereto.

In some embodiments the chute comprises a funnel with a frustoconical shape. The ash pan may comprise a floor bounded by a wall having a flange at a top thereof, the flange resting on the funnel when the ash pan occupies the area below the chute. The floor may further comprise a floor ring defining an opening selectively covered by a lift out section that covers the opening. The lift out section may further comprise a dome shaped cover. In some embodiments, the floor ring further comprises a recess circumscribing the opening, the recess providing a descending wall affixed to a shelf, the shelf supporting the lift out section and the descending wall preventing lateral movement thereof. The dome shaped cover may have a downward projecting rim that rests on the shelf, and possibly a handle affixed on a top thereof. In some cases, the ring is perforated, and the cover is perforated away from the handle.

In other embodiments the chute comprises a plurality of planar segments. In such cases, the ash pan may comprise a rectilinear floor bounded by a plurality of upright walls having a plurality of flanges contacting the plurality of planar segments when the ash pan occupies the area below the chute.

The invention of the present disclosure, in another aspect thereof, comprises a fire pit with a floor for supporting a quantity of burning fuel, a plurality of perforations defined in the floor for passing ash therethrough, and a chute directing the ash from below the floor to a collection area below the floor. A first ash pan is removable from above the chute and floor and being selectively placed to collect ash from the chute. A second ash pan is slidably removable from below the chute and being selectively placed to collect ash from the chute when the first ash pan is removed.

In some embodiments, the first ash pan comprises a flange that rests on the chute to suspend the first ash pan partially below the chute for collecting ash. The chute and the ash pan may each have a circular horizontal cross section. In other embodiments, the chute and the ash pan each have a rectilinear horizontal cross section.

The floor may comprise a ring having a recess therein defining an opening, and a lift out section received in the recess and covering the opening. The lift out section may comprise a domed cover circumscribed by a ring fitting into the recess.

The invention of the present disclosure, in another aspect thereof, comprises a fire pit with a combustion chamber with perforated floor, the floor having a removable lift out section on a central opening thereof and being perforated to allow passage of ash therethrough. The fire pit includes an ash chute below the floor directing ash into a first ash pan that is removable from a top of the ash chute through the center opening of the floor, and a second ash pan below the ash chute that collects ash when the first ash pan is removed.

In some embodiments, the ash chute comprises a frustoconical section that suspends the first ash pan by a flange on a circular wall of the first ash pan. In other embodiments, the ash chute comprises a plurality of planar segments supporting the first ash pan by a plurality of flanges on a plurality of walls bounding a floor of the first ash pan.

DETAILED DESCRIPTION OF THE PREFERRED EMBODIMENTS

Figure 1:
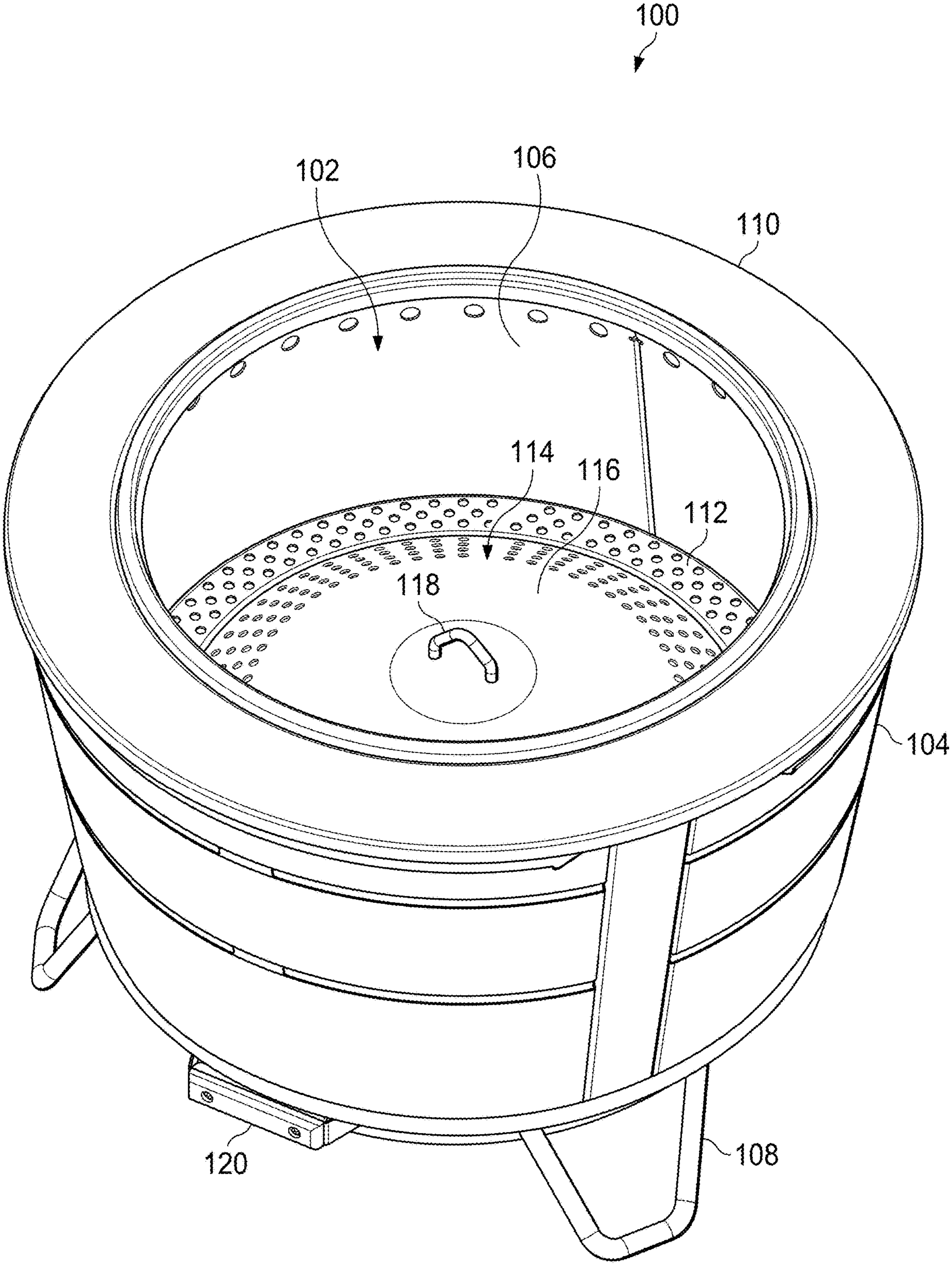
FIG. 1 is a perspective view of a fire pit with ash handling system according to aspects of the present disclosure.
Figure 2:
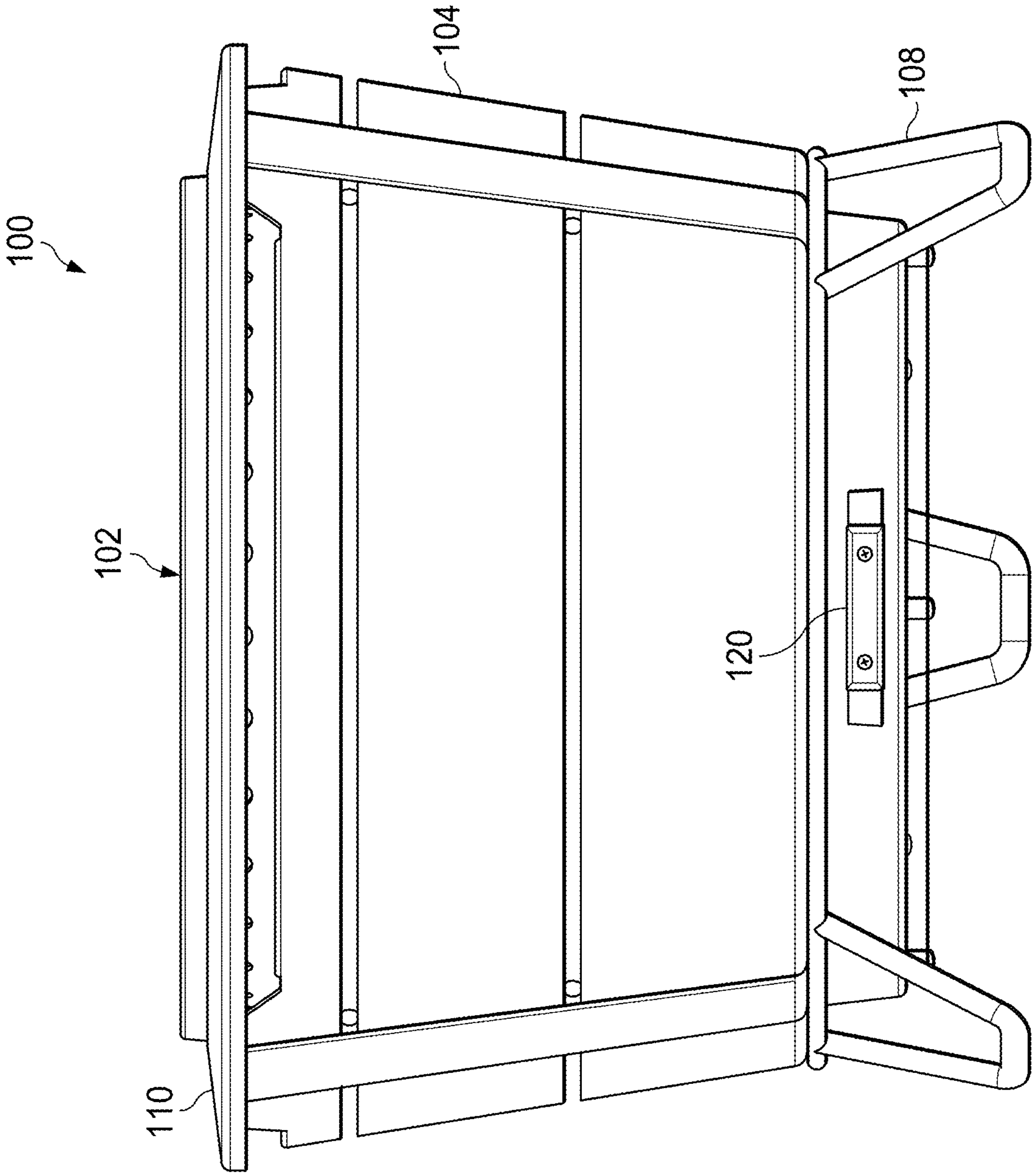
FIG. 2 is a side view of the fire pit of FIG. 1.

Referring now to FIG. 1, a perspective view of a fire pit 100 with ash handling system according to aspects of the present disclosure is shown. FIG. 2 is a side view of the fire pit 100 of FIG. 1. The fire pit 100 may comprise a solid fuel engine or combustion chamber 102 that burns solid fuel such as natural logs, synthetic or manufactured logs, wood pellets, bagged or prepackaged fuel, or other fuels. Ventilation or air supply may be provided at various locations in the combustion chamber 102 to maximize flame, minimize smoke, and/or accomplish a variety of other goals. In some cases, air enters the fire pit 100 via openings in outer all 104. The wall 104 may be slatted or otherwise perforated for admitting air. An inner wall 106 may at least partially define the combustion chamber 102 and define various air intakes to the combustion chamber 102. A fire pit that operates similarly to the manner described is disclosed in US Patent Application Publication No. US 2020/0096199 A1 by Harrington, et al., which is hereby incorporated by reference.

As shown, the firepit 100 has a top cover 110 spanning what would otherwise be an open space between walls 104, 106. The fire pit 100 may sit on a base 108 or may be provided with a stand for elevating the fire pit 100 to a more desirable height and/or reduce the chance of scorching grass or other material near the fire pit 100.

The fire pit 100 may have a bottom grate or perforated floor 112. The floor 112 may be considered a part of the combustion chamber 102 in that combustion air may enter the combustion chamber 102 via the floor 112, as well as the floor providing for ash and solid material to pass therethrough via the perforations or openings therein.

The floor 112 may be configured as a flat or planar ring or annular component, or may otherwise define a large opening therein that is selectively covered by a lift out section 114. The lift out section 114 may comprise a cover 116 and may have a handle 118 on or near a center of top thereof allowing for easy removal (e.g., by hand or with a hook or other fire tending tool). The cover 116 may have a domed, conic, or tapered shape such that fuel is directed toward the inner wall 106 and the floor 112 as the fire burns. This may promote ash flow through the floor 112 as well as promote desired burning characteristics by tending to move active combustion toward openings in the floor 112 and/or wall 106. The cover 116 may also define openings or perforations located more toward the outer edge (e.g., toward the floor 112) than the more centrally located handle 118.

As a part of the ash handling system and mechanism, the fire pit 100 may include a removable ash pan 120. The ash pan 120 may comprise a removable drawer with a handle for ease of operation. The ash pan 120 may collect ash and solid matter that passes through the floor 112 and/or cover 116. The ash pan 120 may be periodically removed by the user to dispose of ash. The ash pan 120 may be one or multiple options for ash handling where the ash pan 120 is easily location (e.g., when the fire pit 100 is used with the stand 108).

Figure 3:
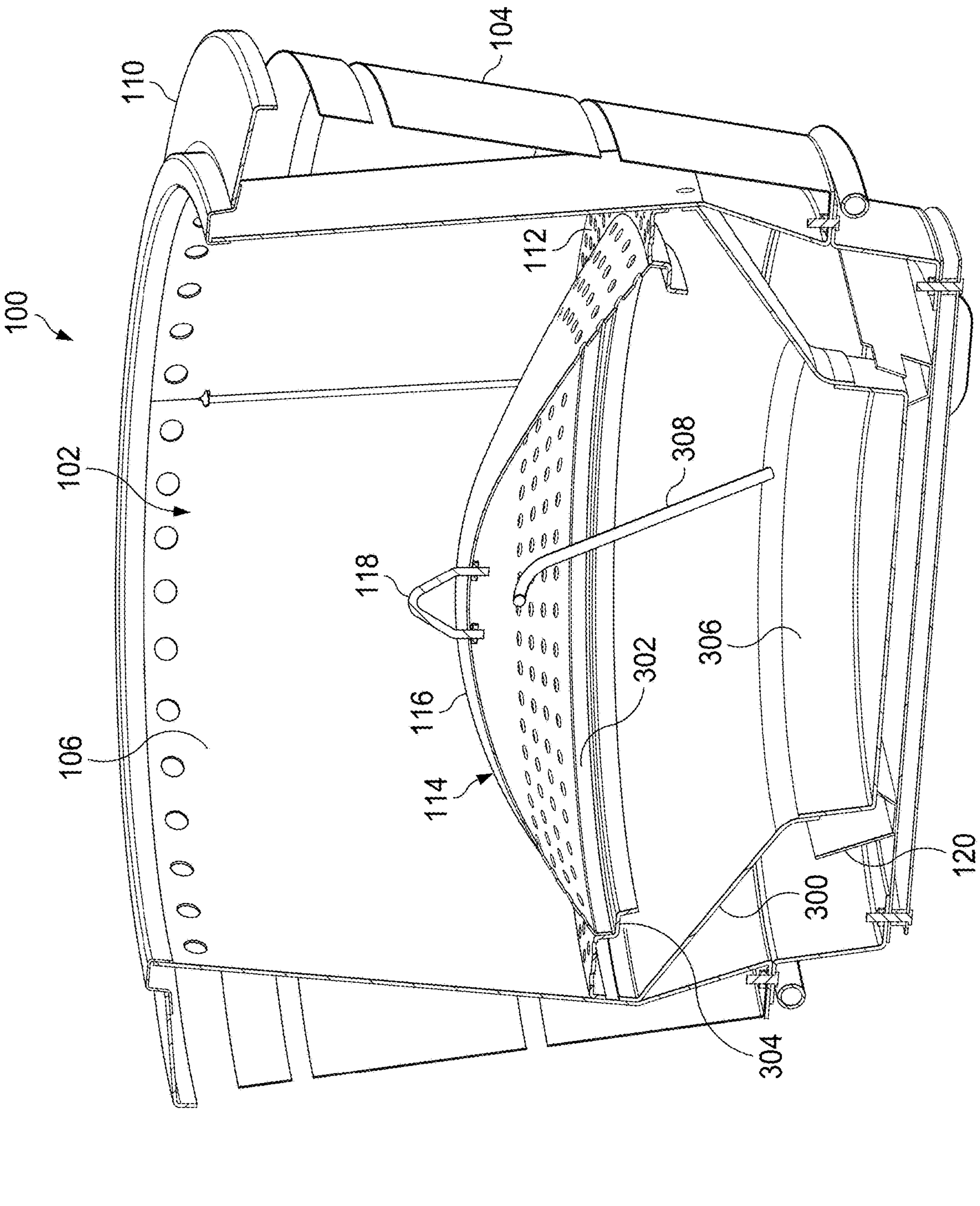
FIG. 3 is a perspective cutaway view of the fire pit of FIG. 1.

Referring now to FIG. 3, a perspective cutaway view of the fire pit of FIG. 1 is shown. Here it can be see that additional features and components provide for additional ash handling systems and methods. Instead of, or in addition to, the ash pan 120 the fire pit 100 may contain a lift out ash pan 306. The lift out ash pan 306 may be situated below the cover 116, situated to collect ashes and solid material falling through openings in the cover 116 and/or the floor 112. The lift out ash pan 306 may include an affixed handle 308 that may be used to lift the ash pan 306 out of the fire pit 100 through the combustion chamber 102 without the need to access the exterior of the fire pit 100 (e.g., around or below the outer wall 104). In some embodiments, in order to access the handle 308 and/or ash pan 306 the lift out section 114 or cover 116 may first be removed (e.g., by the handle 118). The handle 308 may extend upwardly from the ash pan 306 toward the cover 118 and in some cases may occupy part of a space near or within the cover 116. The handle 308 may have an arc shape, a loop shape, a series of joined straight segments, and/or another configuration.

The cutaway perspective of FIG. 3 also illustrates that the floor 112 may have a recess 304 circumscribing a central opening therein that is sized at least large enough to allow the lift out ash pan 306 and handle 308 to pass through. The central opening defined by the floor 112 and/or recess 304 may be circular or have another shape. The lift out section 114 may have a rim 302 having a cooperating size and shape with the recess 304 to fit therein. Fitting of the rim 302 in the recess 304 may ensure the lift out section is properly placed with respect to the floor 112 and/or prevent unwanted movement of the lift out section 114 when the fire pit 100 is in use. The rim 302 may be integral with, and/or may descend, from the cover 116.

The ash pan 120 and/or the lift out ash pan 306 may have a foot print or area for collecting falling ash and other solid material that is smaller than an overhead area of the floor 112 including the lift out section 114. Therefore, a chute 300 may be provided for directing ash and other solid material falling through the floor 112 and/or lift out section 114 into the ash pan 306 or the ash pan 120. The chute 300 may comprise a funnel that may be frustoconical or at least have a frustoconical section as shown. In some embodiments, the chute 300 has a circular cross horizontal section of decreasing area from top to bottom. However, in other embodiments, the chute 300 may comprise one or planar sections joined together and having a lower opening sized to direct ash and/or solid matter into the ash pan 120 or the lift out ash pan 306. The chute 300 may affixed at an upper portion to the floor 112 or to the inner wall 106. In some embodiments, attachment of the chute 300 to the inner wall 104 allow the inner wall 104 to provide intake openings below the floor 112, if desired.

Figure 4:
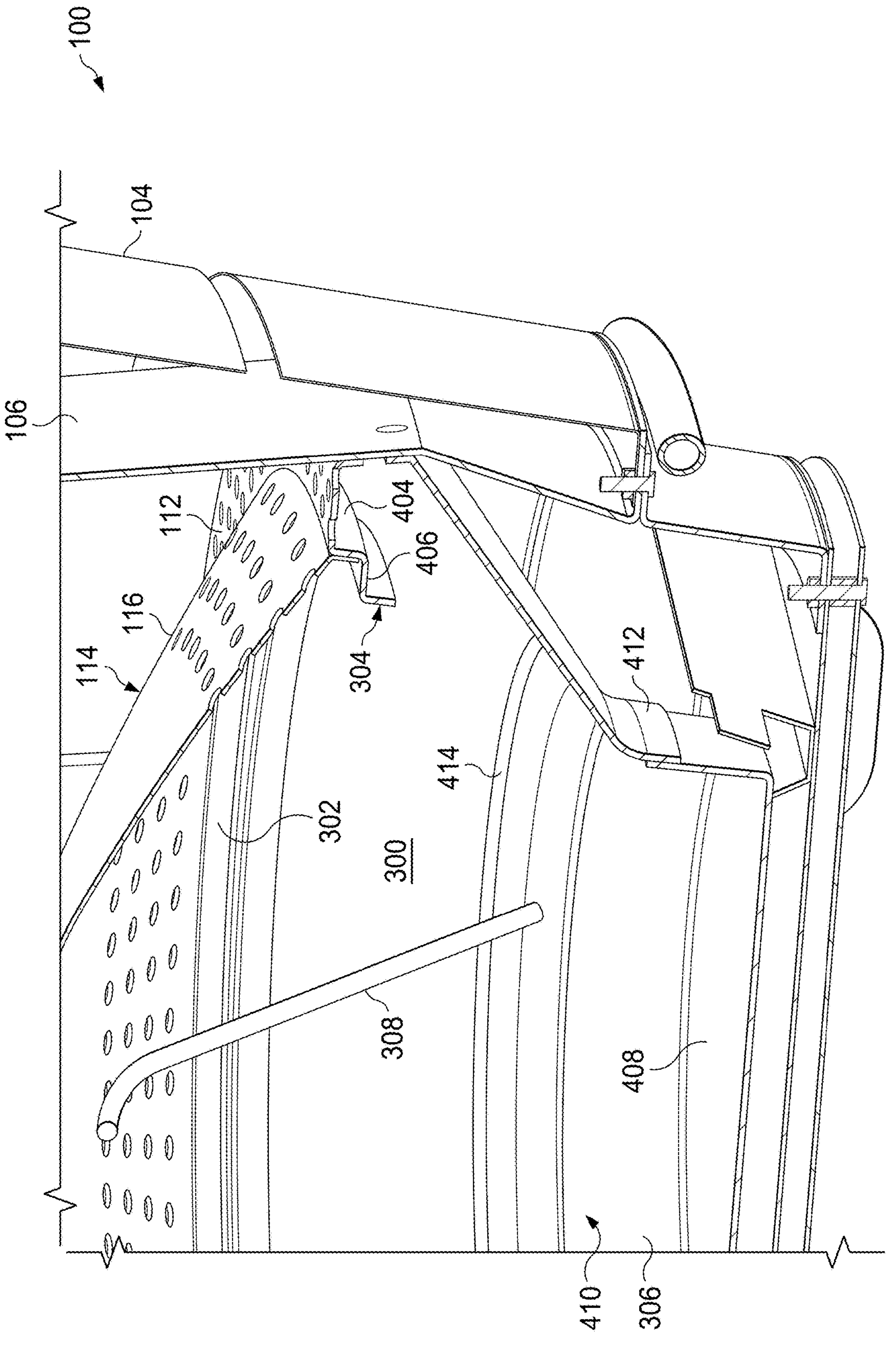
FIG. 4 is a close-up perspective cutaway view of the fire pit of FIG. 1.

FIG. 4 is a close-up perspective cutaway view of the fire pit of FIG. 1. FIG. 4 further illustrates the relationship between various components internal to the fire pit 100. The recess 304 of the floor 112 may comprise a horizontal descending wall 404 fitting to a horizontal shelf 406. The wall 404 may or may not be vertical but may be wide enough to accommodate the rim 302 of the lift out section 114 such that the rim 304 may sit on the shelf 406. The shelf 406 may not be perfectly horizontal but the opening defined by the shelf 406 may be small enough that the lift out section 114 cannot inadvertently fall completely into the opening and below the floor 112. The handle 308 of the ash pan 306, when present, may also prevent this. In some embodiments, contact between the rim 302 and/or the cover 116 against the wall 404 may prevent movement or displacement of the lift out section 114 even in the presence of shifting fuel loads or other lateral forces.

The ash pan 306 may comprise a floor 408 circumscribed by an ascending wall 412. In some embodiments, the floor 408 is circular and planar. The wall 412 may be vertical or have another ascending angle or profile. The floor 408 and wall 412 may be sized to fit within a lower opening 410 of the chute 300. An outward protruding flange 414 may be affixed or integrated with the wall and have an outer diameter larger than a diameter of the lower opening 410 of the chute 300. An angle of the flange 414 may match or approximately match the angle or profile of the chute 300 proximate the lower opening 410 such that the ash pan 306 is suspended from the chute 300 below the lower opening 410 to capture ash and solid matter. The handle 308 may affix to an inner side of the wall 412 and/or to the flange 414.

Figure 5:
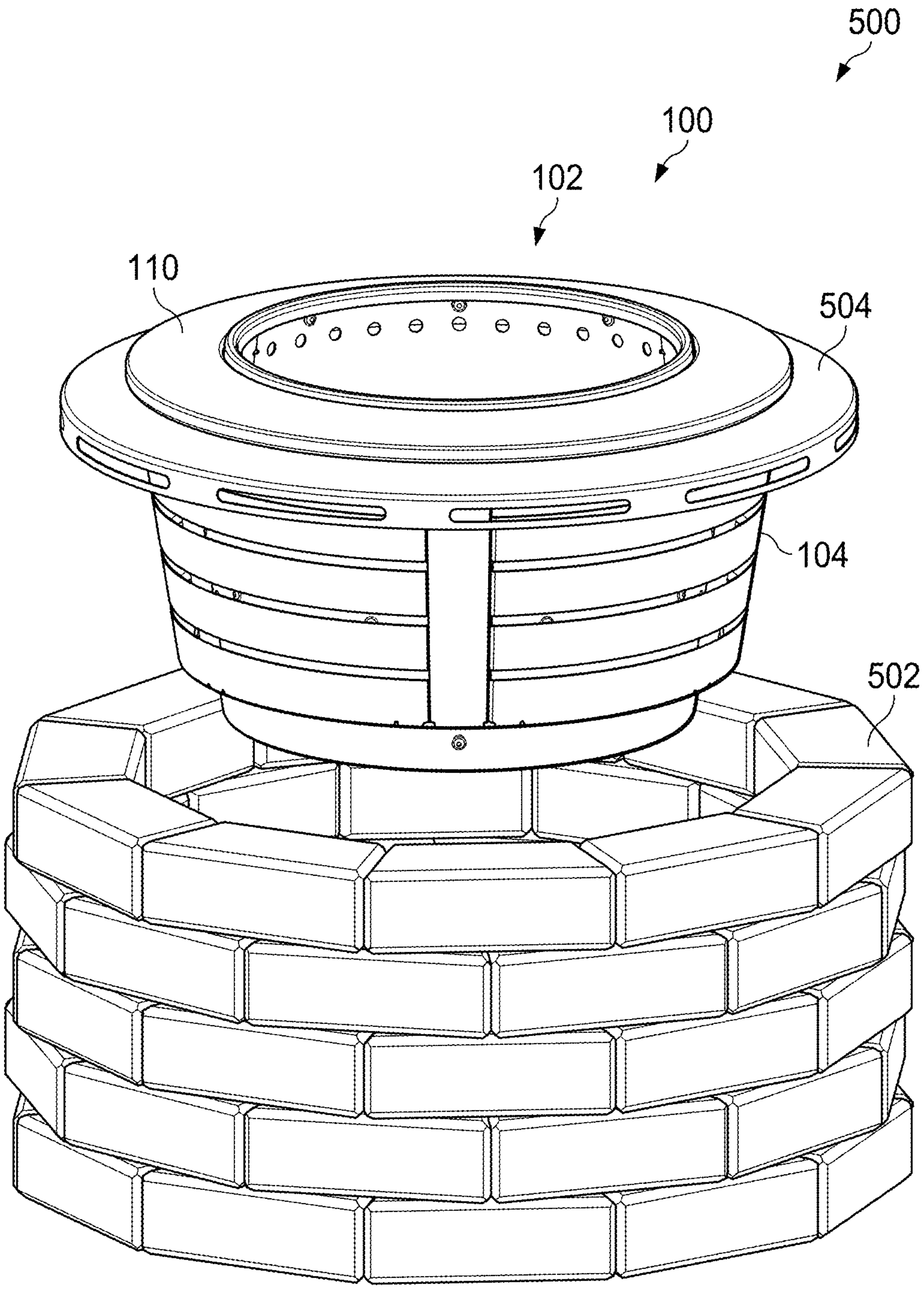
FIG. 5 is a partially exploded perspective view of a fire pit installation with ash handling system according to aspects of the present disclosure.

Referring now to FIG. 5, a partially exploded perspective view of a fire pit installation 500 with ash handling system according to aspects of the present disclosure is shown. The fire pit installation 500 may comprise a permanent structure 502 into which the fire pit 100 is installed. Various ventilation mechanisms may be needed for the installation 500 to allow proper air flow to the fire pit 100, especially if the fire pit 100 relies on air intake separate from the top of the combustion chamber 102. Thus, a ventilation ring 504 may be used and/or ventilation openings in the structure 502 itself.

If no access is provided through the permanent structure 502 to access an ash pan, such as ash pan 120, it would not suitable or practical for use. As shown, for example, once the fire pit 100 is installed into the permanent structure 502, only the top cover 100 and/or the combustion chamber 102 are easily accessible. Thus, the lift out ash pan 306 as described above may be utilized. The ash pan 120, if provided, may be discarded or left in place (if large enough to accommodate the lift out ash pan 306).

Figure 6:
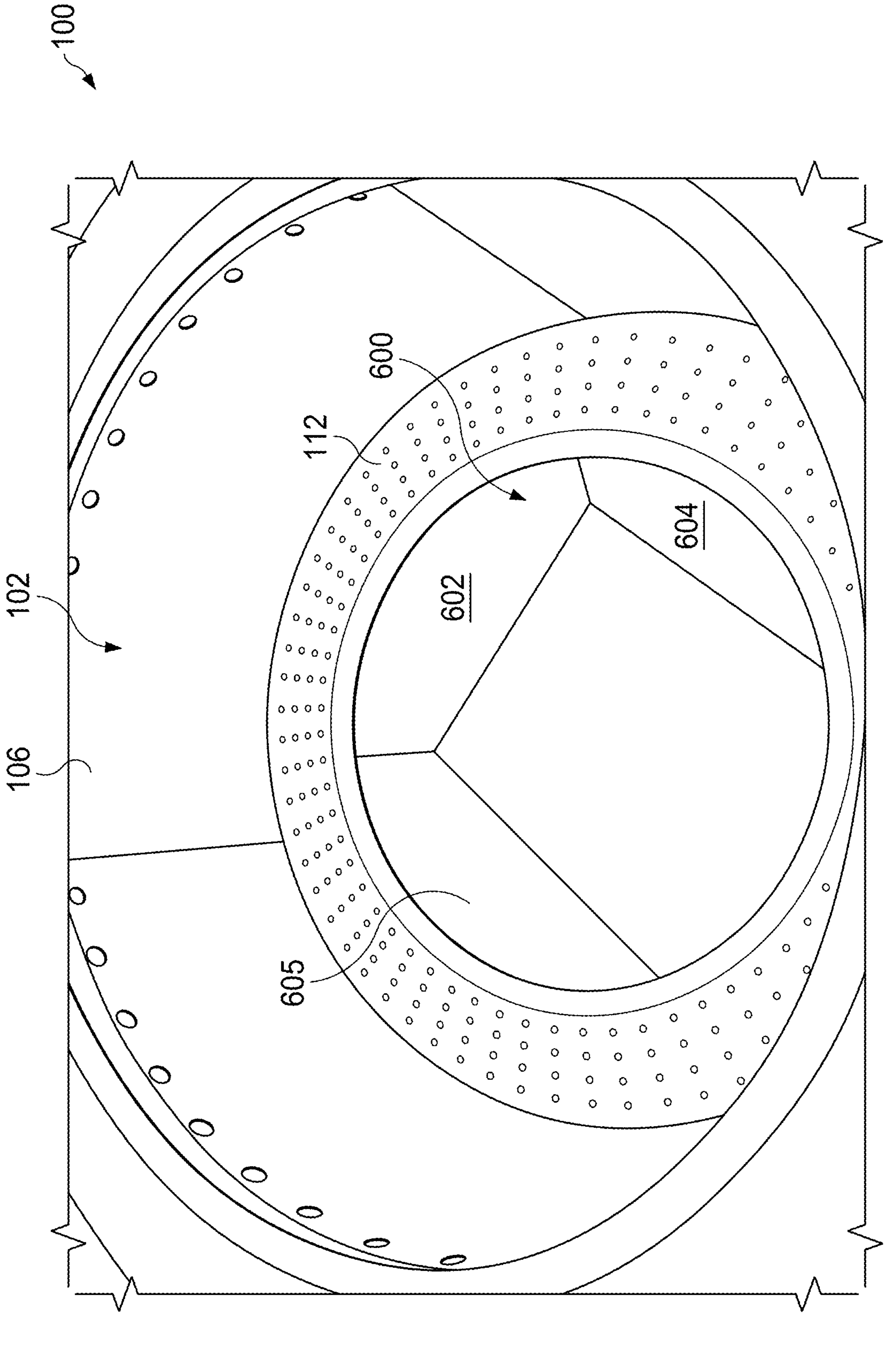
FIG. 6 is close-up interior perspective view of another fire pit with ash handling system according to aspects of the present disclosure.

FIG. 6 is close-up interior perspective view of another fire pit 100 with ash handling system according to aspects of the present disclosure. FIG. 6 illustrates the interior of the combustion chamber 102. Inner wall 106 can be seen circumscribing the floor 112. Lift out section 412 (FIGS. 3-4) has been removed along with the ash pan to illustrate interior chute 600. The chute 600 is provided in place of the chute 300 previously described. The chute 600 comprises planar panels 602, 604, 605, and another (out of frame) that join together and function to direct ash and debris into the ash pan 700 (FIG. 7).

Figure 7:
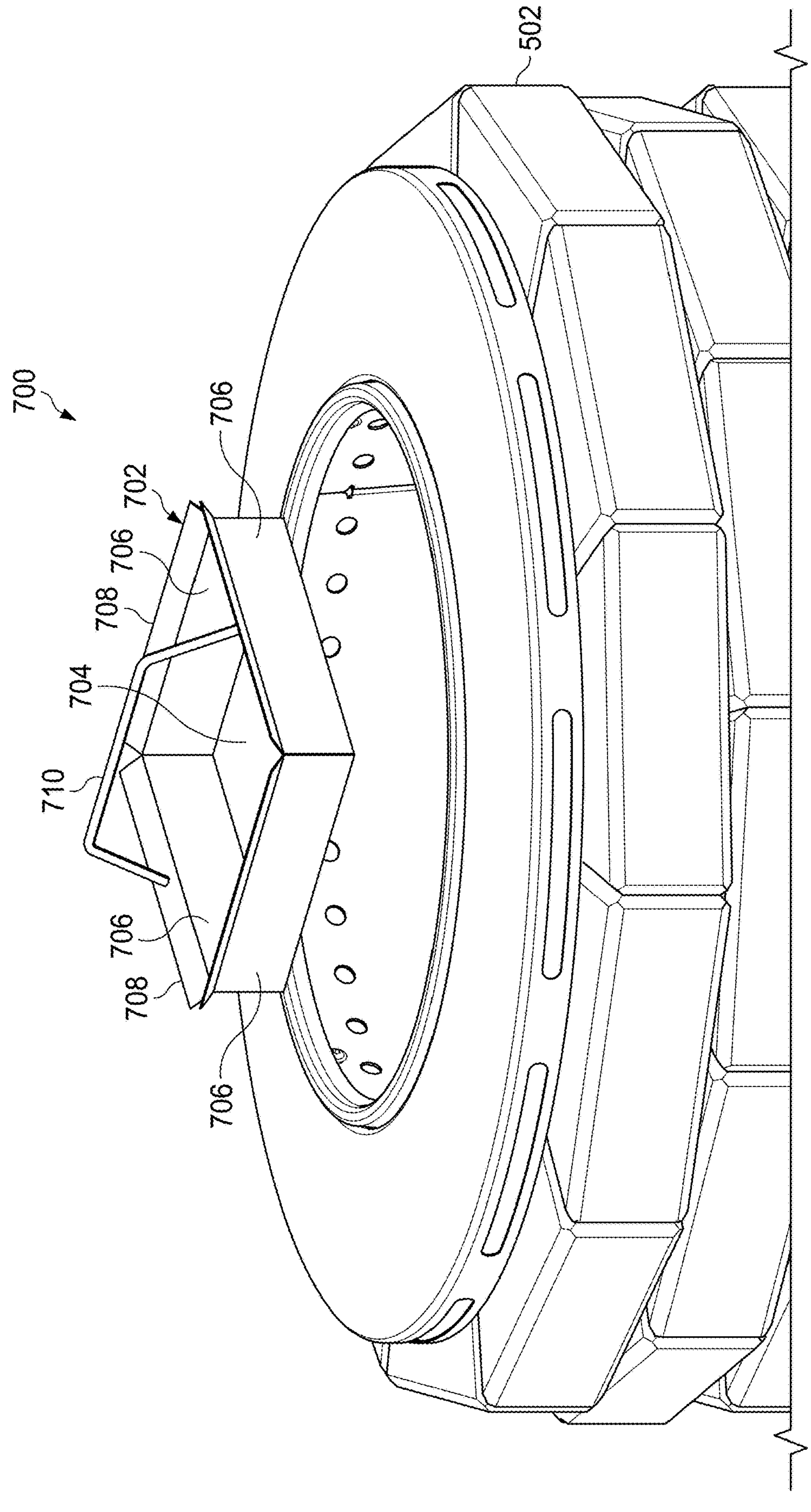
FIG. 7 is perspective view of the fire pit of FIG. 6 with ash pan removed.

FIG. 7 is perspective view of the fire pit of FIG. 6 with ash pan 700 removed. The ash pan 700 may have a shape that conforms to the funnel 600. The ash pan 700 has a squared or generally rectilinear body 702 that includes a floor 704 (which may be a square planar section) bounded by four upright wall 706. The walls 706 may be vertical or slightly tilted outward (e.g., leaning away from the floor 704). The top of each wall 706 may provide an outward projecting flange 708. The angle of the flanges 708 may comport with the angle of the panels 602, 604, 605 of the funnel 600, and the floor 704 and walls 706 may be sized to pass into or below the funnel in order for the ash pan 700 to be suspended below the funnel 600 by the flanges 708 (similar to the arrangement of FIG. 3, for example). A handle 710 may be affixed to a pair of opposing walls 706, opposing flanges 708, or elsewhere on the body 702 to allow for the ash pan 700 to be removed or inserted into the funnel 600 below the floor 112.

It should be understood that various aspects of the ash handling systems and methods of the present disclosure may be adapted for use with firepits other than those specifically constructed as shown herein. While benefits may vary, systems and methods of the present disclosure may be adapted for use with traditional fire pits (e.g., those without specific air flow provisions for reduction of smoke), firepits having different geometrical shapes than those depicted herein, fire pits having different types of permanent installations than shown herein, firepits having different portability features than those shown herein, and others.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A fire pit comprising:

a combustion chamber with a removable perforated floor circumscribed by a wall;

a chute below the perforated floor fixed with respect to the wall directing ash and debris from the floor to an area below the chute; and a removable ash pan occupying the area below the chute and having a handle affixed thereto and extending toward the combustion chamber;

wherein the ash pan is removable from the fire pit upwardly through the combustion chamber.

2. The fire pit of claim 1, wherein the chute comprises a funnel with a frustoconical shape.

3. The fire pit of claim 2, wherein the ash pan comprises an ash pan floor bounded by a wall having a flange at a top thereof, the flange resting on the funnel when the ash pan occupies the area below the chute.

4. The fire pit of claim 3, wherein the perforated floor further comprises a floor ring defining an opening selectively covered by a lift out section that covers the opening.

5. The fire pit of claim 4, wherein the lift out section further comprises a dome shaped cover.

6. The fire pit of claim 5, wherein the floor ring further comprising a recess circumscribing the opening, the recess providing a descending wall affixed to a shelf, the shelf supporting the lift out section and the descending wall preventing lateral movement thereof.

7. The fire pit of claim 6, wherein the dome shaped cover has a downward projecting rim that rests on the shelf.

8. The fire pit of claim 7, wherein the dome shaped cover has a handle affixed on a top thereof.

9. The fire pit of claim 8, wherein the ring is perforated, and the cover is perforated away from the handle.

10. The fire pit of claim 1, wherein the chute comprises a plurality of planar segments.

11. The fire pit of claim 10, wherein the ash pan comprises a rectilinear ash pan floor bounded by a plurality of upright walls having a plurality of flanges contacting the plurality of planar segments when the ash pan occupies the area below the chute.

* * * * *